F. A. DECKER.
COUPLING FOR BATTERY ELEMENTS.
APPLICATION FILED OCT. 5, 1906. RENEWED NOV. 11, 1909.

944,078.

Patented Dec. 21, 1909.

WITNESSES:

INVENTOR
Frank A. Decker
BY
Charles N. Butler
ATTORNEY.

UNITED STATES PATENT OFFICE.

FRANK A. DECKER, OF PHILADELPHIA, PENNSYLVANIA, ASSIGNOR TO DECKER ELECTRICAL MANUFACTURING COMPANY, OF WILMINGTON, DELAWARE, A CORPORATION OF DELAWARE.

COUPLING FOR BATTERY ELEMENTS.

944,078.

Specification of Letters Patent.

Patented Dec. 21, 1909.

Application filed October 5, 1906, Serial No. 337,544. Renewed November 11, 1909. Serial No. 527,568.

*To all whom it may concern:*

Be it known that I, FRANK A. DECKER, a citizen of the United States, residing in the city of Philadelphia, county of Philadelphia, and State of Pennsylvania, have invented certain Improvements in Couplings for Battery Elements, of which the following is a specification.

This invention is an improved coupling for battery elements whereby the parts are more readily connected and disconnected, a close engagement is automatically maintained so that the conduction of current is improved, the parts are insulated in such manner that a metal envelop can be used in the cell, and the destruction due to the electro-chemical action is greatly reduced.

Figure 1:
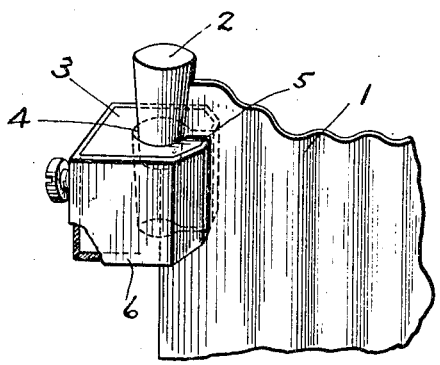
Figure 2:
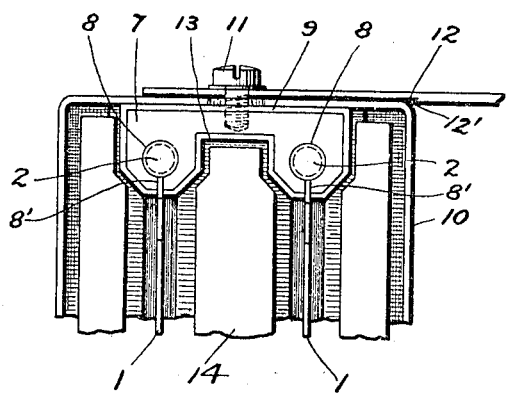
Figure 3:
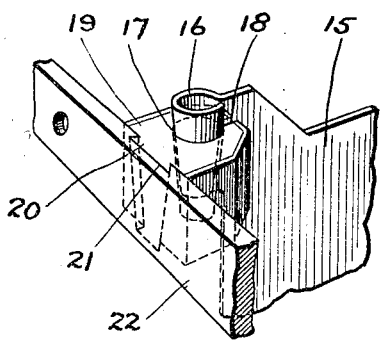
Figure 5:
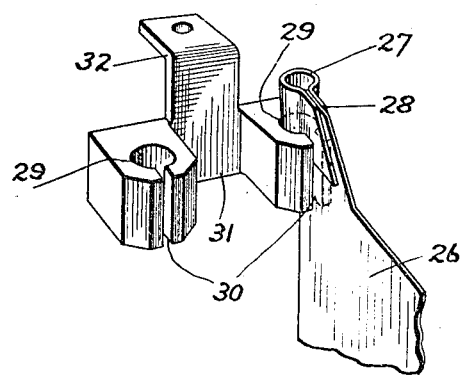
Figure 4:
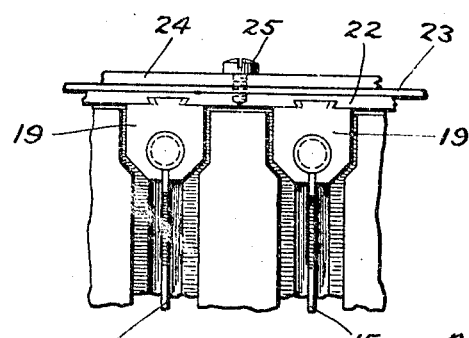

In the accompanying drawings, Figure 1 is a perspective view of a form of the coupling applied to an electrode with parts broken away for the purpose of illustration; Fig. 2 is a plan view of a second form thereof and a portion of a cell to which it is applied; Fig. 3 is a perspective view of a third form with connecting parts; Fig. 4 is a plan view representing an application of the construction shown in Fig. 3; and Fig. 5 is a perspective view of a further form with a section of plate connected thereto.

In the preferred construction, the invention consists, stated broadly, of a downwardly tapered lug secured to the electrode and a holder with a downwardly tapered socket opening through a slot for receiving the lug and a portion of the electrode, the holder being secured to the envelop.

As shown in Fig. 1, the electrode 1 has secured thereto the downwardly tapering bearing in the form of the lug 2 and the holder 3 has therein a downwardly tapered bearing in the form of the socket 4, which receives the lug, and the slot 5 which receives a portion of the plate adjacent thereto. The holder is incased in an insulating shoe 6 to prevent its destruction with the electrode and lug. The insulating casing for the holder further provides for its use with a metal cell envelop by which the connector and electrode may be mechanically supported without being electrically connected therewith.

As shown in Fig. 2, several electrodes 1 with their respective lugs 2 are engaged and supported by a holder 7 having a plurality of sockets 8 and slots 8' therein, the holder being incased in the insulating shoe 9. These parts are supported by the metal envelop 10 by means of the screw 11, which passes through the conducting bar 12 separated by the insulation 12' from the envelop, the envelop and the shoe into the holder, the screw making electrical as well as mechanical connection between the holder and the bar while being out of contact with the envelop. This holder is provided with the recess 13 which receives the end of the negative electrode 14.

As shown in Fig. 3, the electrode 15 has the downwardly tapered lug 16 formed thereon by bending or rolling an extension of the electrode. This lug and electrode are fitted to the socket 17 and the slot 18 of a holder 19 which is provided with a projection 20 providing a downwardly tapering dovetailed bearing fitting a correspondingly dovetailed bearing or seat 21 in the conducting bar 22.

As shown in Fig. 4, the electrodes 15 with the holders 19, engaged to a connecting bar 22 as described, may be engaged within the insulating envelop 23, through which and the conducting bar 24 pass a conducting screw 25 into the conducting bar 22.

As shown in Fig. 5, the electrode 26 has a lug 27 bent up from sheet metal and connected thereto by means of the extensions 28, and a plurality of such electrodes are supported by their engagements with sockets 29 and slots 30 in a holder 31, which has the angular extension 32 for connection with a conductor.

Preferably the lugs and the electrodes are made of the same material, as zinc, and the holders are made of conducting material electro-negative thereto in order that they shall not suffer destruction with the electrodes.

While only the holders shown in Figs. 1 and 2 are incased in insulating shoes, it is to be understood that the remaining forms may be so incased.

Having described my invention, I claim:—

1. A coupling for battery parts comprising, in combination with an electrode, a device having a tapered bearing fixed to said electrode, a holder having a tapered bearing for receiving said device, and an insulating casing for said holder.

2. A coupling for battery parts comprising, in combination with an electrode, a device fixed to said electrode, a holder for engaging said device, and a support for said holder, said holder and support having tapering bearings engaged one by the other.

3. A coupling for battery parts comprising, in combination with an electrode, a device having a tapered bearing fixed to said electrode, a holder having a tapered bearing for engaging the tapered bearing of said device, and a support for said holder, said holder and support having tapering dovetail bearings engaging one with the other.

4. A coupling for battery parts comprising, a conducting bar having a downwardly tapering bearing, a holder having a downwardly tapering bearing engaging said first bearing, and an electrode engaged and supported by said holder.

In testimony whereof I have hereunto set my name this 4th day of October 1906, in the presence of the subscribing witnesses.

FRANK A. DECKER.

Witnesses:
ROBERT JAMES EARLEY,
JOS. G. DENNY, Jr.